(12) United States Patent
Downs et al.

(10) Patent No.: US 9,221,009 B2
(45) Date of Patent: Dec. 29, 2015

(54) SYSTEM AND METHOD FOR SOFTENING WATER FOR USE IN A SCRUBBER

(75) Inventors: William Downs, Alliance, OH (US);
Paul J Williams, Akron, OH (US)

(73) Assignee: The Babcock & Wilcox Company, Baberton, OH (US)

( * ) Notice: Subject to any disclaimer, the term of this patent is extended or adjusted under 35 U.S.C. 154(b) by 7 days.

(21) Appl. No.: 12/689,313

(22) Filed: Jan. 19, 2010

(65) Prior Publication Data

US 2010/0212497 A1 Aug. 26, 2010

Related U.S. Application Data

(60) Provisional application No. 61/154,611, filed on Feb. 23, 2009.

(51) Int. Cl.
| | |
|---|---|
| *B01D 47/12* | (2006.01) |
| *B01D 53/78* | (2006.01) |
| *B01D 53/50* | (2006.01) |
| *C02F 5/02* | (2006.01) |
| *C02F 1/52* | (2006.01) |
| *C02F 103/18* | (2006.01) |

(52) U.S. Cl.
CPC ............... *B01D 53/507* (2013.01); *C02F 5/02* (2013.01); *C02F 1/5236* (2013.01); *C02F 2103/18* (2013.01)

(58) Field of Classification Search
CPC . B01D 53/507; C02F 1/5236; C02F 2103/18; C02F 5/02
See application file for complete search history.

(56) References Cited

U.S. PATENT DOCUMENTS

| | | | | |
|---|---|---|---|---|
| 2,128,027 | A | * | 8/1938 | Clark .......................... 423/242.7 |
| 3,873,532 | A | * | 3/1975 | Dahlstrom et al. ...... 423/243.09 |
| 3,873,673 | A | * | 3/1975 | Teague et al. .............. 423/242.7 |
| 3,989,464 | A | | 11/1976 | Dahlstrom et al. |
| 4,059,513 | A | * | 11/1977 | Zadera .......................... 210/696 |
| 4,410,500 | A | * | 10/1983 | Wang et al. .............. 423/243.11 |
| 5,266,285 | A | * | 11/1993 | Glancy et al. ............ 423/243.09 |
| 5,417,946 | A | * | 5/1995 | Chou et al. .................... 423/210 |

(Continued)

FOREIGN PATENT DOCUMENTS

| | | |
|---|---|---|
| DE | 3901812 A1 | 7/1990 |
| EP | 0853971 A1 | 7/1998 |

(Continued)

OTHER PUBLICATIONS

Taiwanese Office Action for TW Application No. 099104477 dated Sep. 18, 2014.

(Continued)

*Primary Examiner* — Duane Smith
*Assistant Examiner* — Cabrena Holecek
(74) *Attorney, Agent, or Firm* — Eric Marich

(57) ABSTRACT

The present invention relates generally to the field of emission control equipment for boilers, heaters, kilns, or other flue gas-, or combustion gas-, generating devices (e.g., those located at power plants, processing plants) and, in particular to a new and useful method and apparatus designed to improve the water supplied to non-calcium-based, aqueous wet $SO_x$ scrubbers. In another embodiment, the present invention relates to a system and method for softening water for use in non-calcium-based, aqueous wet $SO_x$ scrubbers.

13 Claims, 6 Drawing Sheets

(56) References Cited

U.S. PATENT DOCUMENTS

| | | | |
|---|---|---|---|
| 5,480,619 | A | 1/1996 | Johnson et al. |
| 5,618,511 | A * | 4/1997 | Randolph et al. ............. 423/545 |
| 5,645,807 | A | 7/1997 | College et al. |
| 6,303,083 | B1 | 10/2001 | Johnson et al. |
| 2004/0118783 | A1 * | 6/2004 | Myers et al. .................. 210/718 |
| 2008/0044332 | A1 * | 2/2008 | Rader et al. ................... 423/220 |
| 2009/0294377 | A1 * | 12/2009 | Gallot ........................... 210/737 |

FOREIGN PATENT DOCUMENTS

| | | |
|---|---|---|
| TW | 310313 | 7/1997 |
| TW | 340054 | 9/1998 |

OTHER PUBLICATIONS

Chinese Office Action (1st OA) for CN Application No. 201010127922.0 dated Nov. 20, 2012 (English translation only).

Chinese Office Action (2nd OA) for CN Application No. 201010127922.0 dated Jul. 17, 2013 (English translation only).

Chinese Office Action (3rd OA) for CN Application No. 201010127922.0 dated Jan. 13, 2014 (English translation only).

European Extended Search Report for EP Application No. 10154253.8-1213 dated Jun. 1, 2010.

New Zealand Examination Report for NZ Application No. 583390 dated Aug. 30, 2011.

Sulfur Oxides Control Technology Series: Flue Gas Desulfurization Dual Alkali Process—EPA Summary Report 625/8-80-004, Oct. 1980.

EPA-CICA Fact Sheet—Flue Gas Desulfurization—EPA-452/F-03-034, 2002.

Slack et al.; Sulfur Dioxide Removal From Waste Gases, Second Edition, 1975, pp. 103 to 119.

Mortson et al.; Flue Gas Desulfurization Using Recycled Sodium Bicarbonate, U.S. EPA/DOE/EPRI Combined Power Plant Air Pollutant Symposium: "The Mega Symposium," Aug. 20-23, 2001, Chicago Illinois, USA.

European Office Action for EP Application No. 10154253.8-1213 dated Jan. 20, 2012.

* cited by examiner

SYSTEM AND METHOD FOR SOFTENING WATER FOR USE IN A SCRUBBER

FIELD AND BACKGROUND OF THE INVENTION

1. Field of the Invention

The present invention relates generally to the field of emission control equipment for boilers, heaters, kilns, or other flue gas-, or combustion gas-, generating devices (e.g., those located at power plants, processing plants) and, in particular to a new and useful method and apparatus designed to improve the water supplied to non-calcium-based, aqueous wet $SO_x$ scrubbers. In another embodiment, the present invention relates to a system and method for softening water for use in non-calcium-based, aqueous wet $SO_x$ scrubbers.

2. Description of the Related Art

Sulfur appears in the life cycle of most plants and animals. Most sulfur emitted to the atmosphere originates in the form of hydrogen sulfide from the decay of organic matter. These emissions slowly oxidize to sulfur dioxide ($SO_2$). Under atmospheric conditions, $SO_2$ is a reactive, acrid gas that can be rapidly assimilated back to the environment. However, the combustion of fossil fuels, in which large quantities of $SO_2$ are emitted to relatively small portions of the atmosphere, can stress the ecosystem in the path of these emissions. As used herein, $SO_2$ and $SO_3$ emissions may generally be referred to as sulfur oxides or $SO_x$ emissions.

Man is responsible for the majority of the $SO_2$ emitted to the atmosphere. Annual worldwide emissions are generally accepted to be over 160 million tons, nearly half of which are from industrial sources. The two principal industrial sources are fossil fuel combustion and metallurgical ore refining.

When gaseous $SO_2$ combines with liquid (I) water, it forms a dilute aqueous solution of sulfurous acid ($H_2SO_3$). Sulfurous acid can easily oxidize in the atmosphere to form sulfuric acid ($H_2SO_4$). Dilute sulfuric acid is a major constituent of acid rain. Nitric acid is the other major acidic constituent of acid rain. The respective reactions are written as follows:

$$SO(g) + H_2O(l) \rightarrow H_2SO_3(aq) \quad (1)$$

$$O_2(g) + 2H_2SO_3(aq) \rightarrow 2H_2SO_4(aq) \quad (2)$$

$SO_2$ can also oxidize in the atmosphere to produce gaseous sulfur trioxide ($SO_3$). Sulfur trioxide reactions are written as follows:

$$2SO_2(g) + O_2(g) \rightarrow 2SO_3(g) \quad (3)$$

$$SO_3(g) + H_2O(g) \rightarrow H_2SO_4(l) \quad (4)$$

While Equations 1 and 2 describe the mechanism by which $SO_2$ is converted to sulfuric acid in acid rain, Equations 3 and 4 characterize dry deposition of acidified dust particles and aerosols.

The pH scale, a measure of the degree of acidity or alkalinity, is the method used to quantify the acidity of acid rain. Pure water has a pH of 7 and is defined as neutral, while lower values are defined as acidic and higher values as alkaline. If rainwater contained no sulfuric or nitric acid, its pH would be approximately 5.7 due to absorption of carbon dioxide ($CO_2$) from the atmosphere. The contributions of man-made $SO_2$ and nitrogen oxides ($NO_x$) further reduce the pH of rainwater. No uniformly accepted definition exists as to what pH constitutes acid rain. Some authorities believe that a pH of about 4.6 is sufficient to cause sustained damage to lakes and forests in the northeastern portion of North America and in the Black Forest region of Europe.

$SO_2$ Emissions Regulations:

Legislative action has been responsible for most industrial $SO_2$ controls. Major landmark regulations include the Clean Air Act Amendments of 1970, 1977 and 1990 in the United States (U.S.), the Stationary Emissions Standards of 1970 in Japan, and the 1983 $SO_2$ Emissions Regulations of the Federal Republic of Germany. Since the mid-1980s, $SO_2$ emissions regulations have been implemented in most other industrialized nations and many developing nations.

$SO_2$ Control:

Most utilities have adopted one of two strategies for $SO_2$ control, either switching to low sulfur coal or installing scrubbers. A variety of $SO_2$ control processes and technologies are in use and others are in various stages of development. Commercialized processes include wet, semidry (slurry spray with drying) and completely dry processes. The wet flue gas desulfurization (WFGD) scrubber is the dominant worldwide technology for the control of $SO_2$ from utility power plants, with approximately 85% of the installed capacity, although the dry flue gas desulfurization (DFGD) systems are also used for selected lower sulfur applications.

Total annual $SO_2$ emissions in the U.S., including electric utility $SO_2$ emissions, have declined since 1970 as various regulations have been adopted. During the same period, electricity generation from coal has almost tripled (see Table 1 below).

TABLE 1

| U.S. $SO_2$ Emissions and Coal-Fired Power Generation | | | |
|---|---|---|---|
| Year | Total U.S. $SO_2$ $10^6$ t/yr | Utility $SO_2$ $10^6$ t/yr | Coal Fired Utility Generation $10^{12}$ kWh |
| 1970 | 31 | 17 | 0.7 |
| 1980 | 26 | 17 | 1.2 |
| 1990 | 23 | 16 | 1.6 |
| 2000 | 16 | 11 | 2.0 |

A significant portion of this emissions reduction has been the result of switching to low sulfur coal, predominantly from the western U.S. In 1970 virtually all of the utility coal came from the eastern, higher sulfur coal fields, while by 2000 approximately half of the coal came from western low sulfur sources. Slightly less than two-thirds of $SO_2$ emission reductions have been attributed to fuel switching while over a third has been through the installation of flue gas desulfurization systems, predominantly wet scrubbers. More than 50% of the U.S. coal-fired capacity already has FGD systems installed and operating. This may increase to more than 80% over the next decade and a half as existing regulations are implemented and proposed regulations are adopted.

Wet Scrubbers—Reagents:

Wet scrubbing processes are often categorized by reagent and other process parameters. The primary reagent used in wet scrubbers is limestone. However, any alkaline reagent can be used, especially where site-specific economics provide an advantage. Other common reagents are lime (CaO), magnesium enhanced lime (MgO and CaO), ammonia ($NH_3$), and sodium carbonate ($Na_2CO_3$). In the case of sodium carbonate ($Na_2CO_3$), scrubbers based on this chemistry suffer scaling problems due to the presence of dissolved calcium in the makeup water. Scaling problems require unit outages for cleaning WFGD absorbers every 6 to 8 months. This puts soda based scrubbers at a disadvantage compared to limestone based WFGD.

The process by which soda, or sodium carbonate, wet scrubbers operate is well known to those of skill in the art. For example, one suitable reaction process is detailed in *Sulfur Oxides Control Technology Series: Flue Gas Desulfurization Dual Alkali Process* (EPA Document 625/8-80-004, October 1980), the text of which is hereby incorporated by reference as though fully set forth herein in its entirety.

In one instance, natural fresh water is used as the base stock for the raw makeup water. Such waters, prior to treatment, contain varying amounts of inorganic impurities, the most common being dissolved calcium, magnesium, iron, carbonates, and sulfates in ionic form. Water that has not been treated to remove any of these impurities is sometimes referred to as raw water. The total carbonate content in the raw water is referred to informally as the total alkalinity. The hardness of the water is in turn determined directly by the total amount of calcium and magnesium. The term generally refers to the negative effect that these ions have on the ability of soaps and detergents to lather in hard water. In the context of a wet scrubber that uses sodium hydroxide, sodium carbonate, or sodium bicarbonate as a reagent to scrub sulfur dioxide from a flue gas, or combustion gas, the concern about the hardness constituents in the raw water is that as raw water becomes exposed to the scrubber solutions inside the wet scrubber, the calcium ions will react with carbonate ions, sulfite and bisulfite ions and sulfate ions to form solid calcium carbonate, solid calcium sulfite, and solid calcium sulfate. Such solid compounds tend to deposit on the internals of the scrubber causing scaling sufficient to render the scrubber inoperable. Such a situation requires, at some point, the operator of the facility to shut such a "fouled" scrubber down long enough to enter the scrubber and manually clean it out. Such an operation involves significant time in lost production and physical cleaning expenses. To mitigate such detrimental consequences, an operator attempts to reduce the amount of hardness in the raw water by treating that water prior to use in such a scrubber. One such conventional treatment method is depicted in FIG. 1.

As is illustrated in FIG. 1, conventional system 100 includes floc supply line 102, sodium carbonate ($Na_2CO_3$) solution supply line 103, raw water supply line 104 and lime supply 106. Lime supply 106 supplies lime to detention slaker 108. Detention slaker 108 includes therein at least one agitating device (e.g., a mixer) and is provided with a water supply line to permit the mixing of the lime from lime supply 106 with water to yield a lime slurry that is supplied, via lime slurry supply line 110, to precipitator/crystallizer 112. Also supplied to precipitator/crystallizer 112 are floc via floc supply line 102, sodium carbonate solution via sodium carbonate supply line 103 and raw water via raw water supply line 104. Precipitator/crystallizer 112 also includes at least one agitating device (e.g., a mixer) to facilitate the mixing of the sodium carbonate solution, floc, raw water and lime slurry. Once any undesirable solids are permitted to "settle out" and/or precipitate to the bottom of precipitator/crystallizer 112, this treated solution of sodium carbonate solution, lime, raw water and floc is supplied via supply line 114 to a settler/thickener 116. In settler/thickener 116 the once-treated mixture of sodium carbonate solution, lime, raw water and floc is further treated to remove additional unwanted solid particles via the use of one or more agitating devices (e.g., a mixer). The solids generated by this process are then supplied, with an appropriate amount of solution, to a sludge pond 122, via supply line 118, to permit further settling and reclamation of the solids contained in such a waste solution. Additionally, or in some cases optionally, a portion of the solids generated by settler/thickener 116 are re-supplied, with an appropriate amount of solution, to precipitator/crystallizer 112 via supply line 120 to supply seed crystals for the precipitation stage.

Once any undesirable solids are permitted to "settle out" and/or precipitate to the bottom of settle/thickener 116, the twice-treated solution of sodium carbonate solution, lime, raw water and floc is supplied via supply line 124 to treated water tank 126. In treated water tank 126 the twice treated solution of sodium carbonate solution, lime, raw water and floc is combined with sulfuric acid ($H_2SO_4$) from sulfuric acid tank 130 via sulfuric acid supply line 132. This combination of twice-treated solution and sulfuric acid is then further agitated via a suitable device (e.g., a mixer) until a desired pH is obtained. Once this occurs, the suitably treated solution is supplied to a wet scrubber via supply line 134.

As is known to those of skill in the art, lime softening works by raising the pH of the raw water and causing the bicarbonate to convert to carbonate and then precipitating the calcium as calcium carbonate. Once the pH rises to above about 10, magnesium starts to precipitate as magnesium hydroxide. FIG. 2 is a plot of the calcium and magnesium concentration of a raw water that contains only calcium and magnesium carbonates and bicarbonates. Note that the calcium concentration actually begins to rise as the magnesium drops above a pH of 10.

Given the data contained in FIG. 2, the only way that one could achieve both low magnesium and low calcium values would be to perform the softening in two stages. First, one has to raise the pH to 11 and after separating out the precipitates, lower the pH back to 10 with, for example, sulfuric acid to precipitate out the excess calcium as calcium carbonate.

If raw water contains only calcium and magnesium sulfates, then lime softening will remove no calcium at all but the magnesium will be removed at a pH above 10. That is confirmed via the data shown in FIG. 3. So lime softening does have the capacity to reduce calcium concentration if the raw water contains principally calcium carbonate. But to remove both calcium and magnesium, the system must be operated in two stages. Removing the magnesium at a pH above 11 and then reducing the calcium at a pH around 10.

Given the above, a need exists for a method and/or apparatus that provides for an efficient manner by which to remove the undesirable calcium ions from the raw water used for make-up in non-calcium-based, aqueous wet $SO_x$ scrubbers.

SUMMARY OF THE INVENTION

The present invention relates generally to the field of emission control equipment for boilers, heaters, kilns, or other flue gas-, or combustion gas-, generating devices (e.g., those located at power plants, processing plants) and, in particular to a new and useful method and apparatus designed to improve the water supplied to non-calcium-based, aqueous wet $SO_x$ scrubbers. In another embodiment, the present invention relates to a system and method for softening water for use in non-calcium-based, aqueous wet $SO_x$ scrubbers.

Accordingly, one aspect of the present invention is drawn to a system designed to treat and/or soften raw water supplied to a non-calcium-based, aqueous wet $SO_x$ scrubber, the system comprising: (a) at least one floc supply means; (b) at least one raw water supply means; (c) at least one sodium carbonate supply means; (d) at least one waste liquor supply means, wherein the waste liquor is supplied from a portion of the waste liquor generated by at least one non-calcium-based, aqueous wet $SO_x$ scrubber; (e) at least one precipitator/crystallizer tank, wherein the at least one floc supply means, the at least one raw water supply means, the at least one sodium carbonate supply means and the at least one waste liquor supply means all supply their respective compounds to the at least one precipitator/crystallizer tank, and wherein the at least one precipitator/crystallizer tank has at least one outlet; and (f) at least one settler/thickener tank that is in fluid communication with the at least one outlet of the at least one precipitator/crystallizer tank, the at least one settler/thickener tank having at least one outlet designed to supply treated water to a non-calcium-based, aqueous wet $SO_x$ scrubber.

Another aspect of the present invention is drawn to a system designed to treat and/or soften raw water supplied to a non-calcium-based, aqueous wet $SO_x$ scrubber, the system comprising: (a) at least one floc supply means; (b) at least one raw water supply means; (c) at least one sodium carbonate supply means; (d) at least one lime slurry supply means; (e) at least one first precipitator/crystallizer tank, wherein the at least one floc supply means, the at least one raw water supply means, the at least one sodium carbonate supply means and the at least one lime slurry supply means all supply their respective compounds to the at least one first precipitator/crystallizer tank, and wherein the at least one first precipitator/crystallizer tank has at least one outlet; (f) at least one first settler/thickener tank that is in fluid communication with the at least one outlet of the at least one first precipitator/crystallizer tank, the at least one first settler/thickener tank having at least one outlet; (g) at least one second precipitator/crystallizer tank that is in fluid communication with the at least one outlet of the at least one first settler/thickener tank, wherein the at least one second precipitator/crystallizer tank has at least one outlet; (h) at least one waste liquor supply means, wherein the at least one waste liquor supply means is in fluid communication with the at least one second precipitator/crystallizer tank, wherein the waste liquor is supplied from a portion of the waste liquor generated by at least one non-calcium-based, aqueous wet $SO_x$ scrubber, and wherein the at least one waste liquor supply means supplies waste liquor to the at least one second precipitator/crystallizer tank to precipitate excess calcium; and (i) at least one second settler/thickener tank that is in fluid communication with the at least one outlet of the at least one second precipitator/crystallizer tank, the at least one second settler/thickener tank having at least one outlet designed to supply treated water to a non-calcium-based, aqueous wet $SO_x$ scrubber.

In one instance, the above systems utilize less than about 7% by volume of the waste liquor produced by a non-calcium-based, aqueous wet $SO_x$ scrubber to treat and/or soften raw water for a non-calcium-based, aqueous wet $SO_x$ scrubber. In another instance, the above systems utilize less than about 5% by volume of the waste liquor produced by a non-calcium-based, aqueous wet $SO_x$ scrubber to treat and/or soften raw water for a non-calcium-based, aqueous wet $SO_x$ scrubber. In still another instance, the above systems utilize less than about 3% by volume of the waste liquor produced by a non-calcium-based, aqueous wet $SO_x$ scrubber to treat and/or soften raw water for a non-calcium-based, aqueous wet $SO_x$ scrubber. In still another instance, the above systems utilize less than about 2% by volume of the waste liquor produced by a non-calcium-based, aqueous wet $SO_x$ scrubber to treat and/or soften raw water for a non-calcium-based, aqueous wet $SO_x$ scrubber.

Accordingly, another aspect of the present invention is drawn to a system for treating and/or softening raw water for a non-calcium-based, aqueous wet $SO_x$ scrubber substantially as shown and described herein.

Still another aspect of the present invention is a method for treating and/or softening raw water for a non-calcium-based, aqueous wet $SO_x$ scrubber substantially as shown and described herein.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

DESCRIPTION OF THE INVENTION

The present invention relates generally to the field of emission control equipment for boilers, heaters, kilns, or other flue gas-, or combustion gas-, generating devices (e.g., those located at power plants, processing plants) and, in particular to a new and useful method and apparatus designed to improve the water supplied to non-calcium-based, aqueous wet $SO_x$ scrubbers. In another embodiment, the present invention relates to a system and method for softening water for use in non-calcium-based, aqueous wet $SO_x$ scrubbers.

Lime softening relies on the relatively low solubility of calcium carbonate. Solubility expressed in complex ionic systems such as water treatments systems express the solubility of the various inorganic constituents by their solubility products. The solubility product of calcium carbonate at 25° C. is $2.8 \times 10^{-9}$. The solubility product for magnesium carbonate is a little less at $3.5 \times 10^{-8}$. But, the solubility product for $Mg(OH)_2$ is $1.3 \times 10^{-11}$. So, slaked lime, $Ca(OH)_2$ precipitates calcium carbonate by converting $HCO_3^-$ to $CO_3^{-2}$ and precipitates magnesium by increasing the $OH^-$ concentration. But, the soda scrubber generates sulfite and bisulfite ions in the process of absorbing $SO_2$ from the flue gas. Additionally, calcium sulfite has a solubility product of $6.8 \times 10^{-8}$. This means that in one instance one could precipitate calcium from raw water as calcium sulfite directly without raising the pH of the raw water at all.

Figure 4:
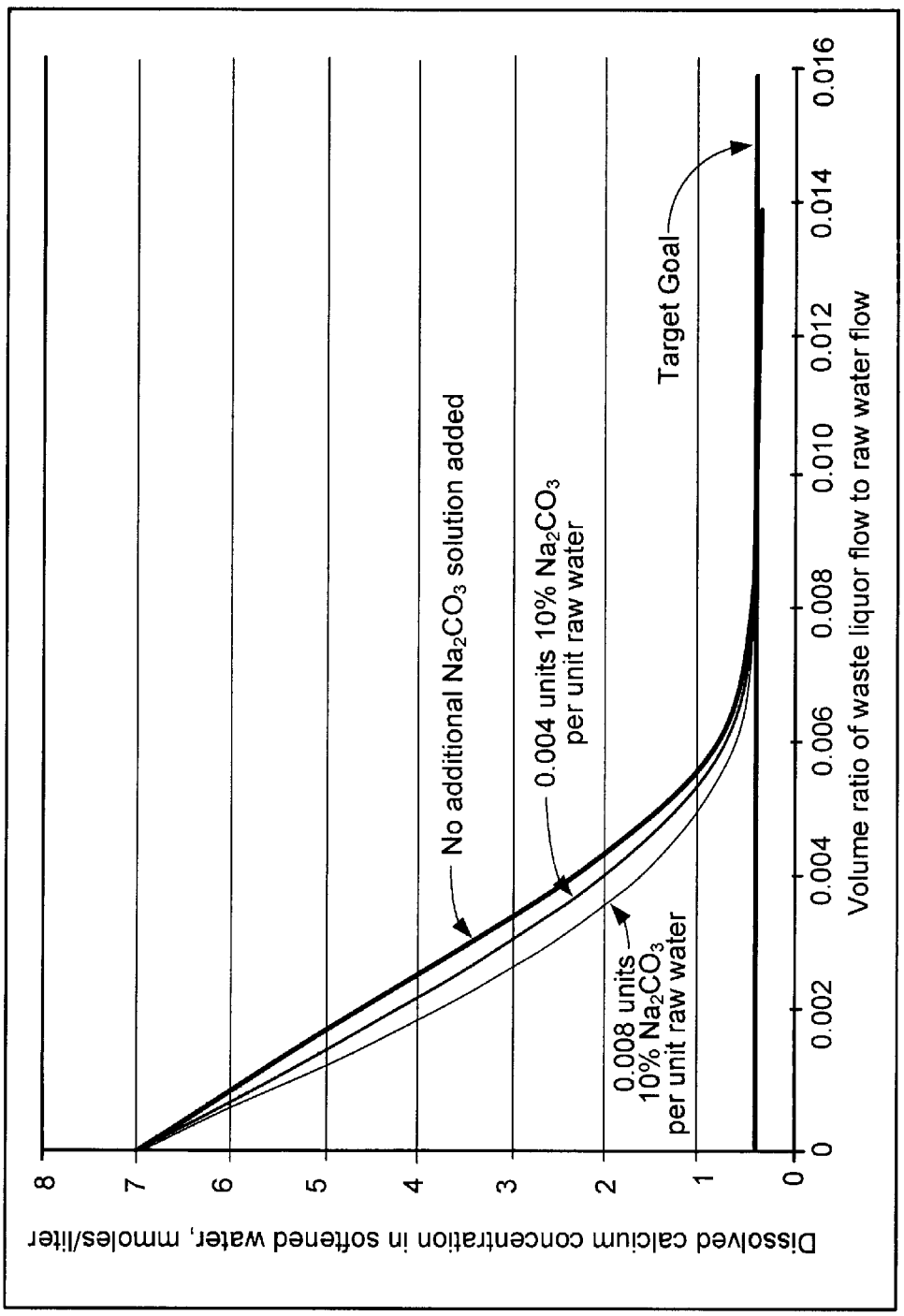
FIG. 4 is a plot showing the ability of a softening system in accordance with one embodiment of the present invention to remove calcium from raw water.

Given this, one embodiment of the present invention involves diverting some of the waste liquor from a non-calcium-based, aqueous wet $SO_x$ scrubber that would be disposed of anyway to a precipitator/crystallizer that is used to treat and/or soften the raw water feed stream for such a wet scrubber. The typical composition of the waste liquor from such a scrubber is: about 70% of the sulfur is in the form of sodium sulfite ($Na_2SO_3$), while about 30% is in the form of sodium sulfate ($Na_2SO_4$); about 7 or 8% (depending on pH) is sodium carbonate ($Na_2CO_3$); and the balance is impurities. Thus, a small portion of waste liquor can be diverted to the water softener, precipitate the calcium as calcium sulfite and deliver the waste liquor and sludge, so produced, to the waste pond for disposal. A plot showing the ability of this system to remove calcium, as an example, is presented in FIG. 4.

In this example, if the waste liquor flow to the softener is established at a rate of 1% by volume of the raw water flow, the calcium concentration can be lowered to the same extent as is achievable with the lime softening system. The softening system overall flow sheet is thus greatly simplified compared to the conventional lime slaking system. Thus, one set-up according to the present invention is schematically illustrated in FIG. 5.

Figure 5:
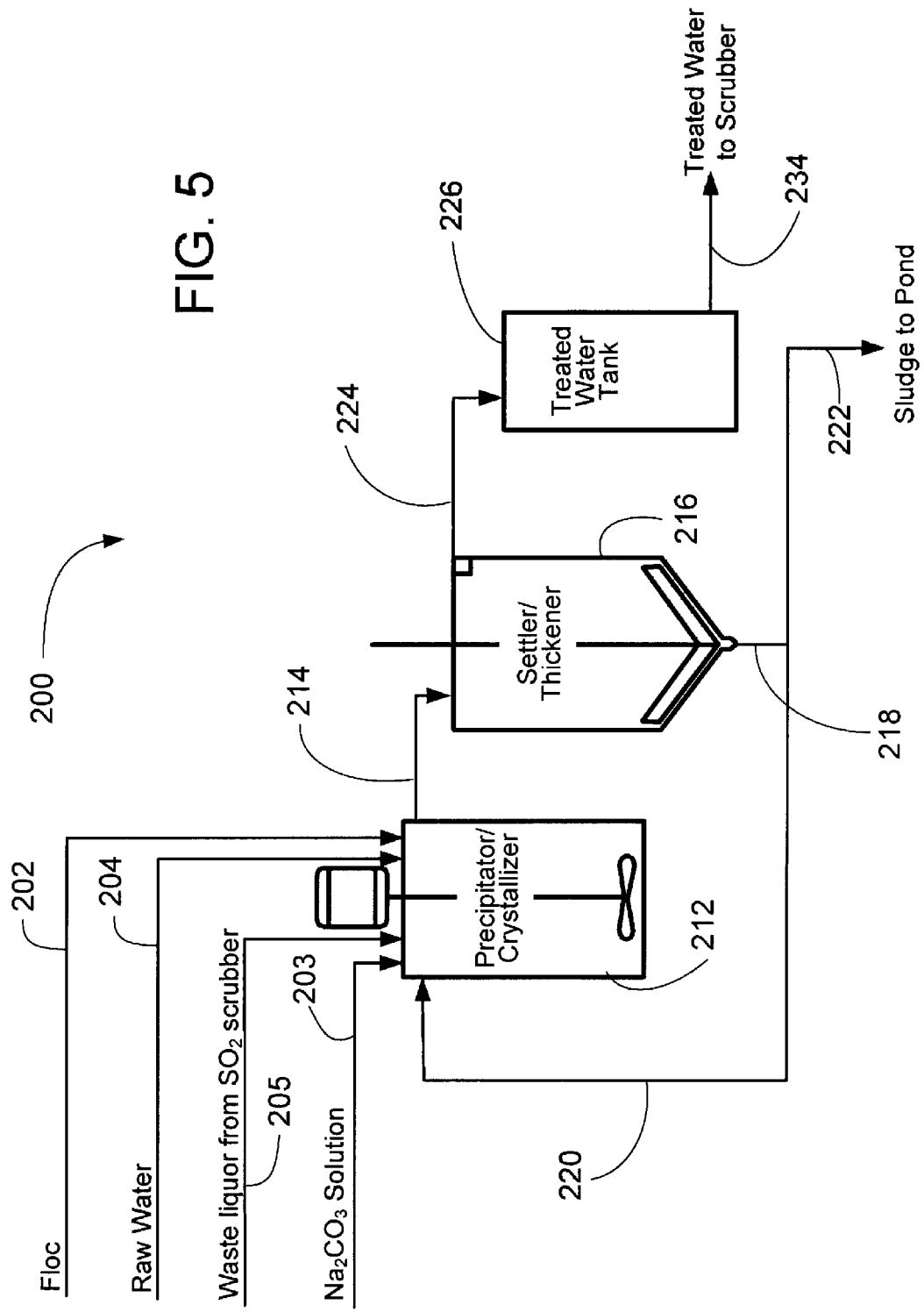
FIG. 5 is a schematic of a raw water softening system in accordance with one embodiment of the present invention where waste liquor from a soda scrubber is used to treat and/or soften raw water.

As is illustrated in FIG. 5, one system 200 in accordance with the present invention includes floc supply line 202, sodium carbonate solution supply line 203 (optional—if the waste liquor does not have enough $Na_2CO_3$), raw water supply line 204 and waste liquor supply line 205. The waste liquor that is supplied via waste liquor supply line 205 comes from the waste liquor from a non-calcium-based, aqueous wet $SO_x$ scrubber. Given this, floc supply line 202, sodium carbonate solution supply line 203, raw water supply line 204 and waste liquor supply line 205 respectively supply floc, sodium carbonate solution, raw water and waste liquor to precipitator/crystallizer 212. Precipitator/crystallizer 212 also includes at least one agitating device (e.g., a mixer) to facilitate the mixing of the floc, sodium carbonate solution, raw water and waste liquor. Once any undesirable solids are permitted to "settle out" and/or precipitate to the bottom of precipitator/crystallizer 212, this treated solution of floc, sodium carbonate solution, raw water and waste liquor is supplied via supply line 214 to a settler/thickener 216. In settler/thickener 216 the once-treated mixture of floc, sodium carbonate solution, raw water and waste liquor is further treated to remove additional unwanted solid particles via the use of one or more agitating devices (e.g., a mixer). The solids generated by this process are then supplied, with an appropriate amount of solution, to a sludge pond 222, via supply line 218, to permit further settling and reclamation of the solids contained in such a waste solution. Additionally, or in some cases optionally, a portion of the solids generated by settle/thickener 216 are re-supplied, with an appropriate amount of solution, to precipitator/crystallizer 212 via supply line 220 to supply seed crystals for the precipitation stage.

Once any undesirable solids are permitted to "settle out" and/or precipitate to the bottom of settler/thickener 216 the twice-treated solution of floc, raw water and waste liquor is supplied via supply line 224 to treated water tank 226. From this treated water tank 226, the suitably treated solution is supplied to a non-calcium-based, aqueous wet $SO_x$ scrubber via supply line 234.

In one embodiment, less than about 7% by volume, less than about 5% by volume, less than about 3% by volume, or even less than about 2% by volume of the waste soda liquor produced by a non-calcium-based, aqueous wet $SO_x$ scrubber is required to treat the raw water going to such a non-calcium-based, aqueous wet $SO_x$ scrubber. In another embodiment, the amount of waste soda liquor used and/or recycled into the system and/or process of the present invention varies depending upon various factors, each taken alone or in any combination thereof. Such factors include, but are not limited to, the amount of raw water to be treated and/or softened, the appropriate pH for the operation of the scrubber, the amount of calcium and/or calcium ions in the raw water feed, and/or the amount/level of alkalinity in the raw water feed. Given this, the present invention is, in some instances, not limited to any capped amount of waste soda liquor that is used and/or recycled.

In still another embodiment, any amount of waste soda liquor from a non-calcium-based, aqueous wet $SO_x$ scrubber can be used in the systems and/or processes disclosed herein so long as a desired stoichiometric ratio between the calcium ions in the raw water and the sulfite ions contained in the waste soda liquor is achieved. In one instance, a suitable stoichiometric ratio of calcium ions to sulfite ions in the treatment and/or softening process of the present invention is in the range of about 1:4 to about 4:1, or from about 1:3 to about 3:1, or from about 1:2 to about 2:1, or even about 1:1. Here, as well as elsewhere in the specification and claims, individual range limits can be combined to form additional non-disclosed ranges.

In still another embodiment, the stoichiometric ratios of the present invention may be varied to include all increments of one quarter that fall within the ranges disclosed above. In one instance, a suitable stoichiometric ratio of calcium ions to sulfite ions in the treatment and/or softening process of the present invention is in the range of about 1:3.75 to about 3.75:1, 1:3.50 to about 3.50:1, or even down to about 1:1.25 to about 1.25:1.

In light of the above, one embodiment of the present invention eliminates the need to purchase lime and/or sulfuric acid, as well as the purchase of all of the related equipment needed to store, handle and process such compounds. Additionally, the present invention reduces the amount of waste material that must be discarded, i.e. the lime and sulfuric acid that would be consumed in the softening process. The present invention reduces the effluent flow to the waste pond, and prevents any chance that the pond might be shocked with low pH spikes caused by inadvertent sulfuric acid excursions that might otherwise cause $SO_2$ off-gassing from the pond. Furthermore, the control system of the system of the present invention is simplified as well. The lime softening system of the prior art requires careful control of pH compared to the waste liquor control that generally requires proportionate control of the waste liquor flow to the softener in proportion to the raw water flow. Given this, the present invention thus provides for cost savings in reagent costs, equipment costs, disposal costs, and control equipment costs.

Figure 1:
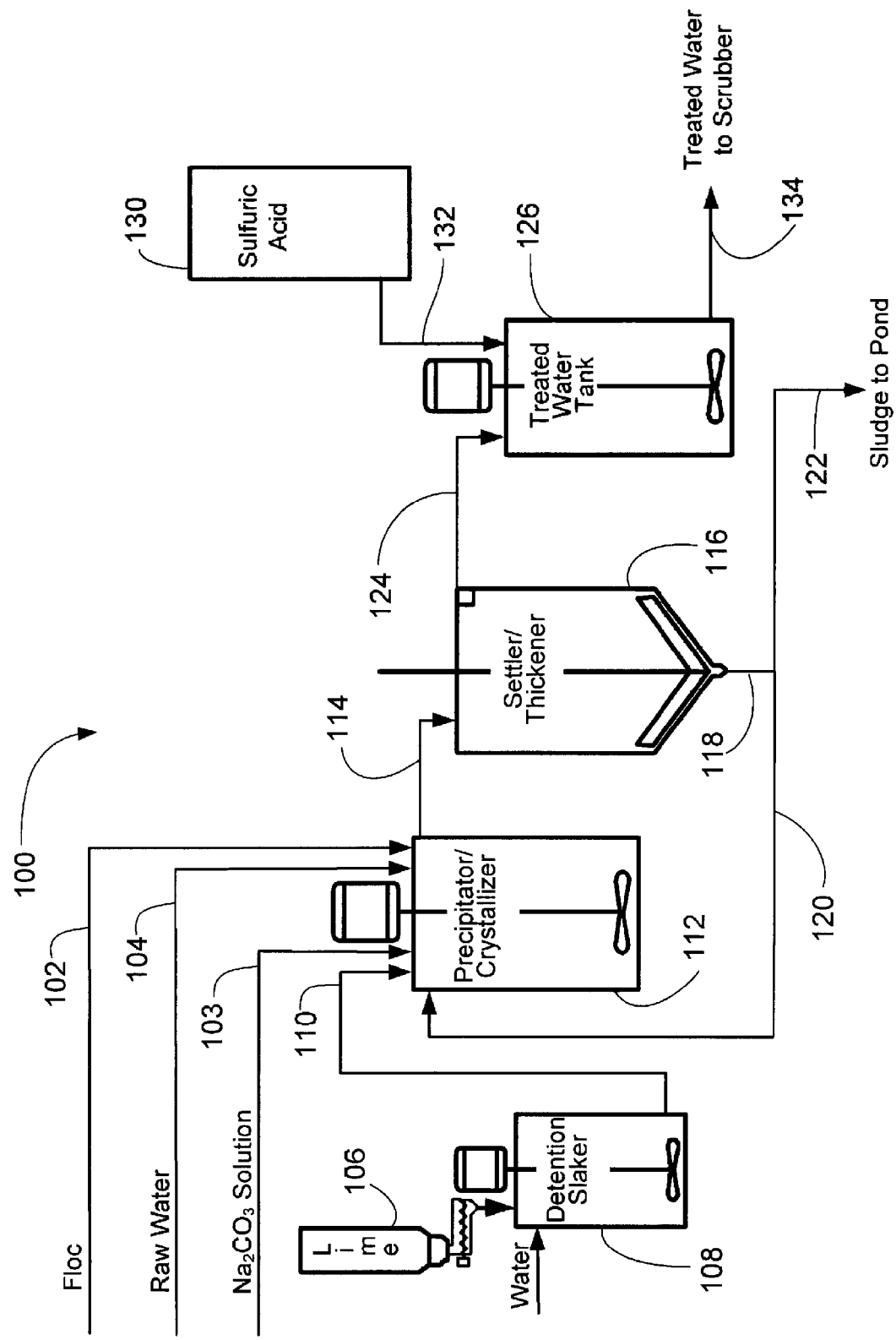
FIG. 1 is an illustration of a conventional system that is designed to treat raw makeup water for use in a wet flue gas desulfurization (WFGD) system.
Figure 2:
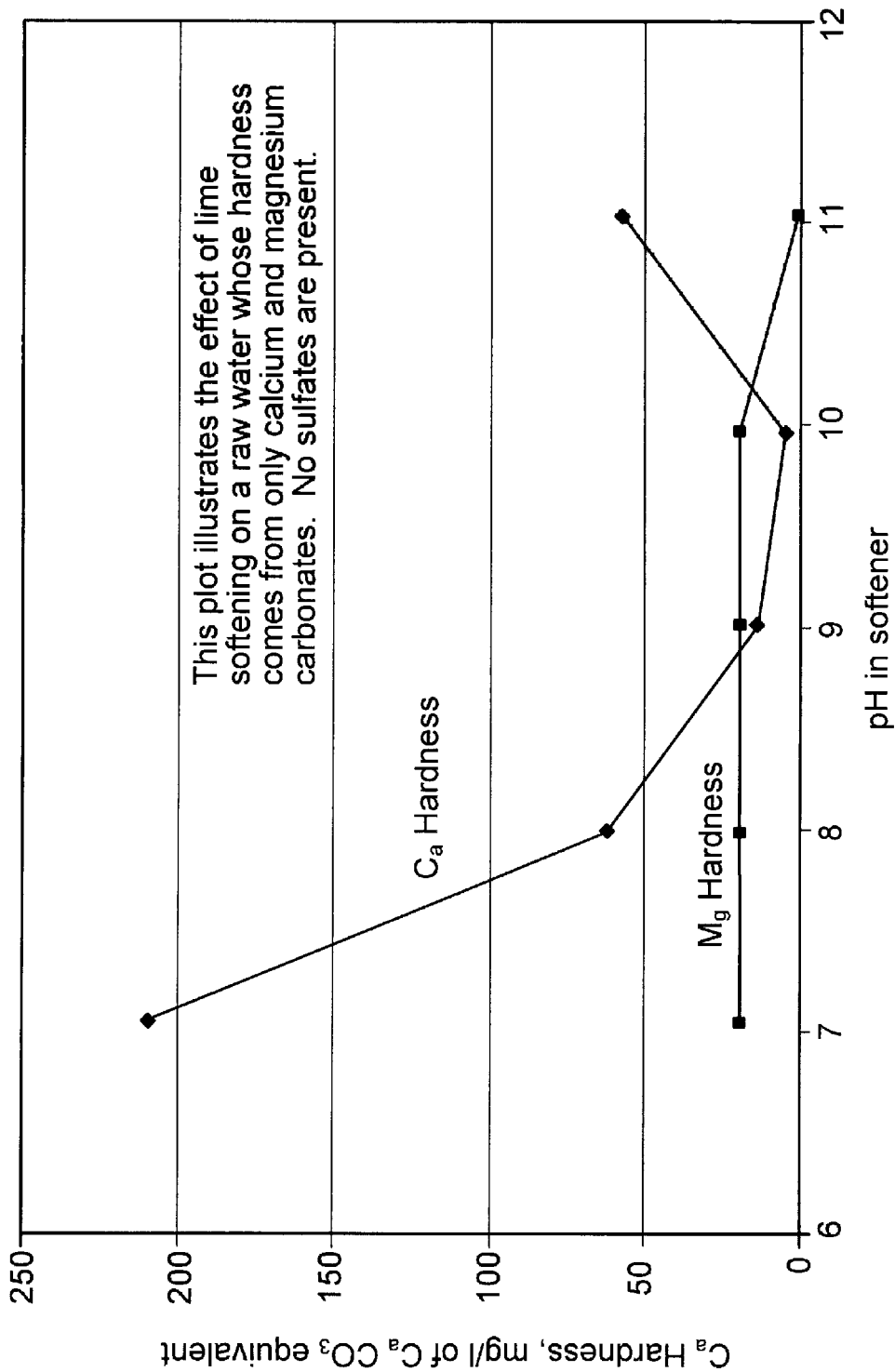
FIG. 2 is a plot that illustrates the effect of lime softening on a raw water whose hardness comes from only calcium and magnesium carbonates (no sulfates were present)
Figure 3:
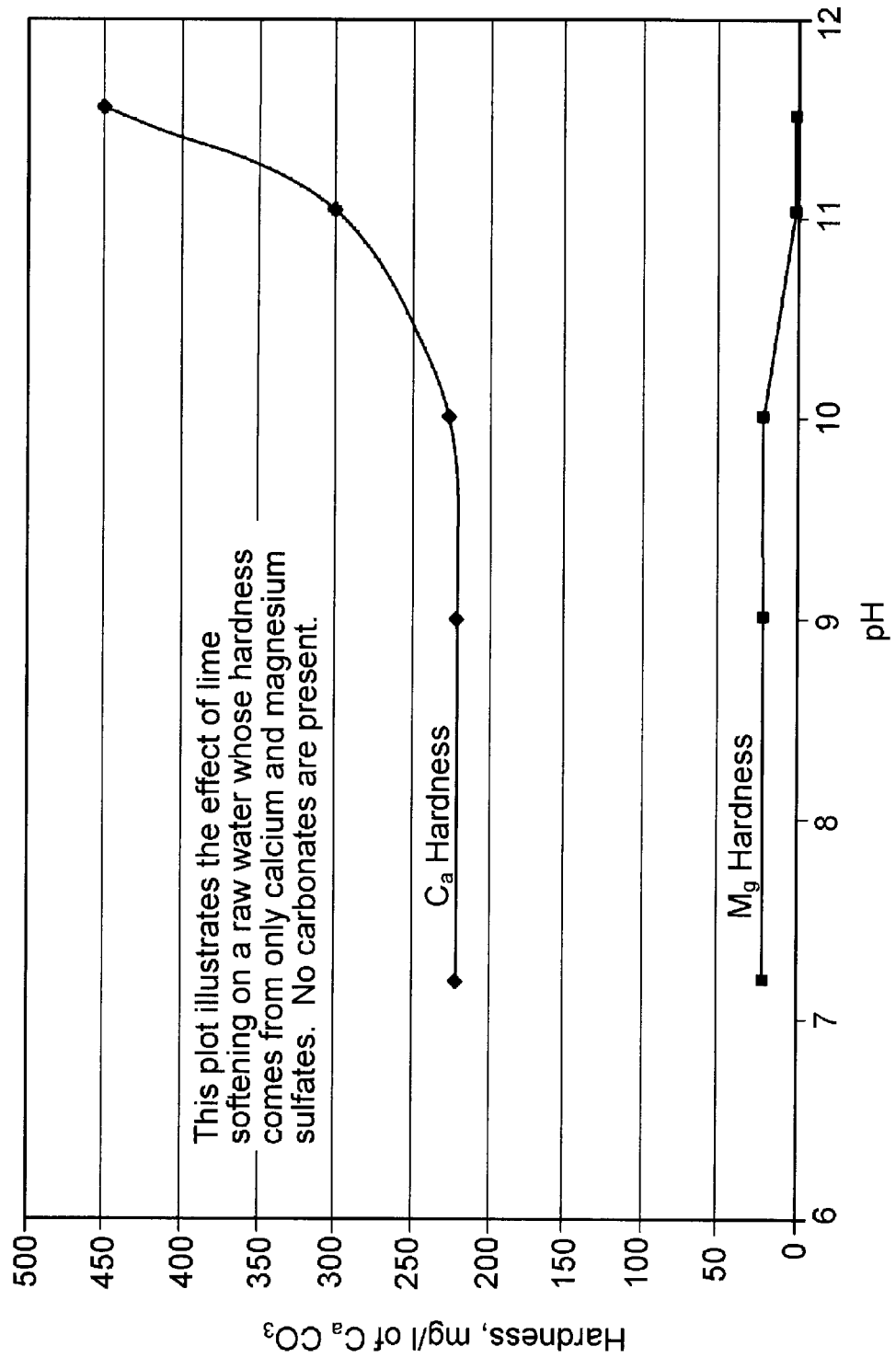
FIG. 3 is a plot illustrating the effect of lime softening on a raw water whose hardness comes from only calcium and magnesium sulfates (no carbonates were present)
Figure 6:
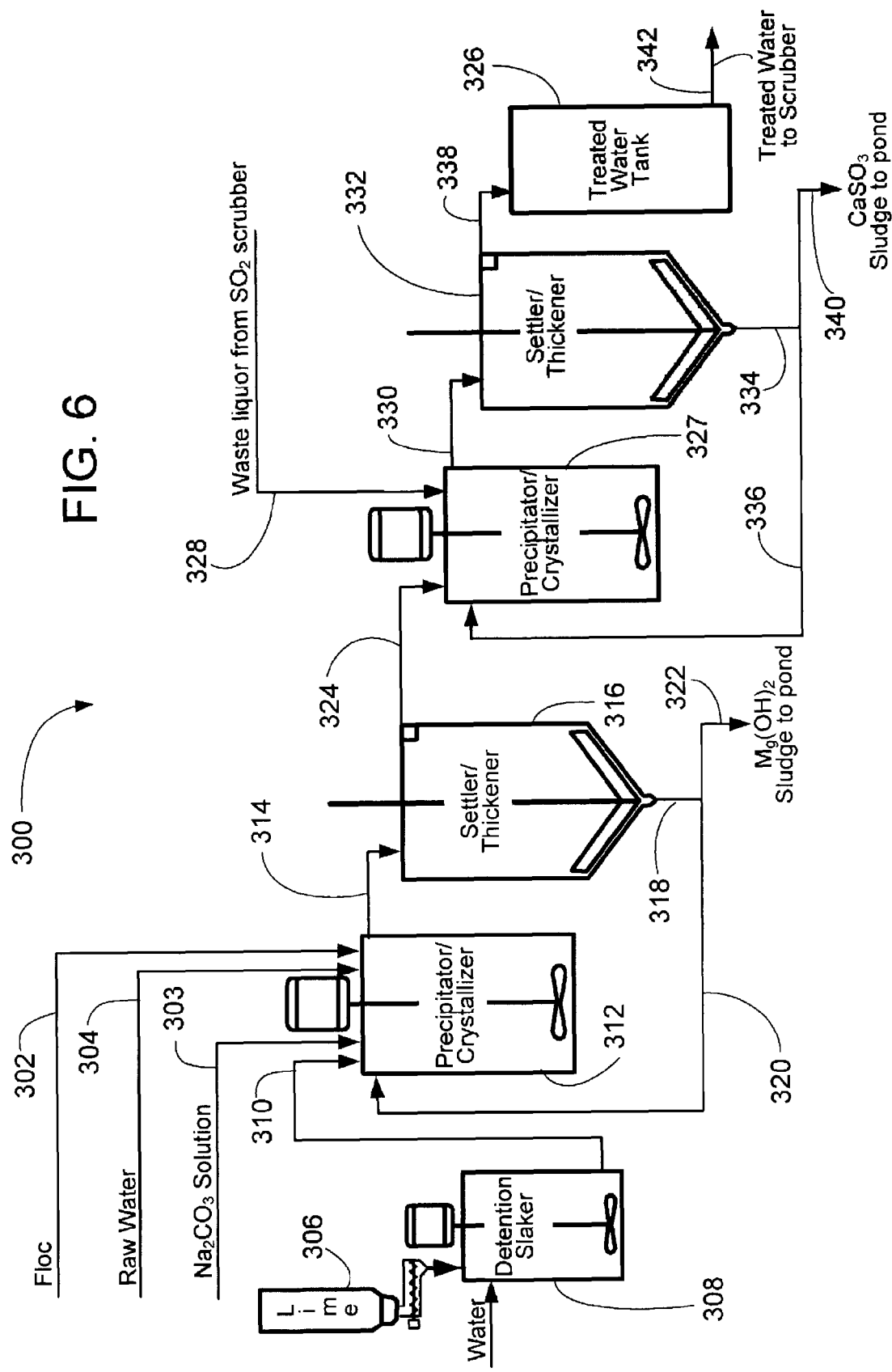
FIG. 6 is a schematic of a raw water softening system in accordance with another embodiment of the present invention where waste liquor from a soda scrubber is used in place of the sulfuric acid in a conventional lime slaking system to treat and/or soften raw water to precipitate the excess calcium that is generated when the pH is raised high enough to precipitate magnesium from the system.

In another embodiment, illustrated in FIG. 6, waste liquor could be used in place of the sulfuric acid in a conventional lime slaking system to precipitate the excess calcium (see FIGS. 2 and 3) that is generated when the pH is raised high enough to precipitate magnesium from the system. This method would precipitate the calcium as calcium sulfite but it would not lower the pH. Once the water treatment has reduced the calcium and magnesium, a high pH treated water can be used in the scrubber to advantage. There is no reason to lower the pH of the treated water prior to its use in the scrubber. As illustrated in FIG. 6, system 300 includes floc supply line 302, sodium carbonate solution supply line 303, raw water supply line 304 and lime supply 306. Lime supply 306 supplies lime to detention slaker 308. Detention slaker 308 includes therein at least one agitating device (e.g., a mixer) and is provided with a water supply line to permit the mixing of the lime from lime supply 306 with water to yield a lime slurry that is supplied, via line 310, to precipitator/crystallizer 312. Also supplied to precipitator/crystallizer 312 are floc via floc supply line 302, sodium carbonate solution via sodium carbonate supply line 303 (optional—if the waste liquor does not have enough $Na_2CO_3$), and raw water via raw water supply line 304. Precipitator/crystallizer 312 also includes at least one agitating device (e.g., a mixer) to facilitate the mixing of the sodium carbonate solution, floc, raw water and lime slurry. Once any undesirable solids are permitted to "settle out" and/or precipitate to the bottom of precipitator/crystallizer 312, this treated solution of sodium carbonate solution, lime, raw water and floc is supplied via supply line 314 to a settler/thickener 316. In settler/thickener 316 the once-treated mixture of sodium carbonate solution, lime, raw water and floc is further treated to remove additional unwanted solid particles via the use of one or more agitating devices (e.g., a mixer). The solids generated by this process (predominantly $Mg(OH)_2$, but may include $CaCO_3$ depending upon the source of the raw water) are then supplied, with an appropriate amount of solution, to a sludge pond 322, via supply line 318, to permit further settling and reclamation of the solids contained in such a waste solution. Additionally, or in some cases optionally, a portion of the solids generated by settler/thickener 316 are re-supplied, with an appropriate amount of solution, to precipitator/crystallizer 312 via supply line 320 to supply seed crystals for the precipitation stage.

Once any undesirable $Mg(OH)_2$ solids are permitted to "settle out" and/or precipitate to the bottom of settler/thickener 316 the twice-treated solution of sodium carbonate solution, lime, raw water and floc is supplied via supply line 324 to a second precipitator/crystallizer 327 which also includes at least one agitating device (e.g., a mixer) to facilitate the mixing. In precipitator/crystallizer 327, the thrice-treated mixture of sodium carbonate solution, lime, raw water and floc is combined with waste liquor from a non-calcium-based, aqueous wet $SO_x$ scrubber via waste liquor supply line 328 to precipitate excess calcium. Once any undesirable solids are permitted to "settle out" and/or precipitate to the bottom of precipitator/crystallizer 327, this treated solution of sodium carbonate solution, lime, raw water and floc is supplied via supply line 330 to a second settler/thickener 332. In settler/thickener 332, the thrice-treated mixture of sodium carbonate solution, lime, raw water and floc is further treated to remove additional unwanted solid particles via the use of one or more agitating devices (e.g., a mixer). The solids generated by this process ($CaSO_3$) are then supplied, with an appropriate amount of solution, to a sludge pond 340, via supply line 334, to permit further settling and reclamation of the solids contained in such a waste solution. Additionally, or in some cases optionally, a portion of the solids generated by settler/thickener 332 are re-supplied, with an appropriate amount of solution, to precipitator/crystallizer 327 via supply line 336 to supply seed crystals for the precipitation stage. The treated water is then supplied via supply line 338 to a treated water tank 326. From this treated water tank 326, the suitably treated solution is supplied to a non-calcium-based, aqueous wet $SO_x$ scrubber via supply line 342.

Given the above, in one embodiment the present invention relates to a system designed to treat and/or soften raw water supplied to a non-calcium-based, aqueous wet $SO_x$ scrubber, the system comprising: (a) at least one floc supply means; (b) at least one raw water supply means; (c) at least one sodium carbonate supply means; (d) at least one waste liquor supply means, wherein the waste liquor is supplied from a portion of the waste liquor generated by at least one non-calcium-based, aqueous wet $SO_x$ scrubber; (e) at least one precipitator/crystallizer tank, wherein the at least one floc supply means, the at least one raw water supply means, the at least one sodium carbonate supply means and the at least one waste liquor supply means all supply their respective compounds to the at least one precipitator/crystallizer tank, and wherein the at least one precipitator/crystallizer tank has at least one outlet; and (f) at least one settler/thickener tank that is in fluid communication with the at least one outlet of the at least one precipitator/crystallizer tank, the at least one settler/thickener tank having at least one outlet designed to supply treated water to a non-calcium-based, aqueous wet $SO_x$ scrubber.

In another embodiment, the present invention relates to a system designed to treat and/or soften raw water supplied to a non-calcium-based, aqueous wet $SO_x$ scrubber, the system comprising: (a) at least one floc supply means; (b) at least one raw water supply means; (c) at least one sodium carbonate supply means; (d) at least one lime slurry supply means; (e) at least one first precipitator/crystallizer tank, wherein the at least one floc supply means, the at least one raw water supply means, the at least one sodium carbonate supply means and the at least one lime slurry supply means all supply their respective compounds to the at least one first precipitator/crystallizer tank, and wherein the at least one first precipitator/crystallizer tank has at least one outlet; (f) at least one first settler/thickener tank that is in fluid communication with the at least one outlet of the at least one first precipitator/crystallizer tank, the at least one first settler/thickener tank having at least one outlet; (g) at least one second precipitator/crystallizer tank that is in fluid communication with the at least one outlet of the at least one first settler/thickener tank, wherein the at least one second precipitator/crystallizer tank has at least one outlet; (h) at least one waste liquor supply means, wherein the at least one waste liquor supply means is in fluid communication with the at least one second precipitator/crystallizer tank, wherein the waste liquor is supplied from a portion of the waste liquor generated by at least one non-calcium-based, aqueous wet $SO_x$ scrubber, and wherein the at least one waste liquor supply means supplies waste liquor to the at least one second precipitator/crystallizer tank to precipitate excess calcium; and (i) at least one second settler/thickener tank that is in fluid communication with the at least one outlet of the at least one second precipitator/crystallizer tank, the at least one second settler/thickener tank having at least one outlet designed to supply treated water to a non-calcium-based, aqueous wet $SO_x$ scrubber.

The various supply means of the present invention include, but are not limited to, tubing, pipes, conduits, hoses, etc. that are designed to carry, supply and/or contain liquid material.

In one instance, the above systems utilize less than about 7% by volume of the waste liquor produced by a non-calcium-based, aqueous wet $SO_x$ scrubber to treat and/or soften raw water for a non-calcium-based, aqueous wet $SO_x$ scrubber. In another instance, the above system utilize less than about 5% by volume of the waste liquor produced by a non-calcium-based, aqueous wet $SO_x$ scrubber to treat and/or soften raw water for a non-calcium-based, aqueous wet $SO_x$ scrubber. In still another instance, the above systems utilize less than about 3% by volume of the waste liquor produced by a non-calcium-based, aqueous wet $SO_x$ scrubber to treat and/or soften raw water for a non-calcium-based, aqueous wet $SO_x$ scrubber. In still another instance, the above systems utilize less than about 2% by volume of the waste liquor produced by a non-calcium-based, aqueous wet $SO_x$ scrubber to treat and/or soften raw water for a non-calcium-based, aqueous wet $SO_x$ scrubber.

Given the above, the following chemical reactions are provided to offer insight into the reaction process that occurs in various raw water treatment and/or softening systems. It should be noted that while the following chemical reactions are provided, that the following chemical reactions do not necessarily represent all of the reactions taking place during the processes discussed herein. Additionally, the present invention is not bound to just the chemical reactions shown below. Conventional lime treatment, softening and/or slaking is detailed in reactions (5) and (6), while reaction (7) detail a reaction of interest in the embodiment of FIG. 5, and reactions (8) and (9) detail the reactions of interest in the embodiment of FIG. 6.

FIG. 1—Stage 1—

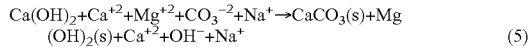

(5)

FIG. 1—Stage 2—

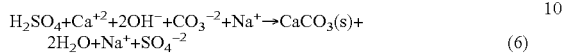

(6)

FIG. 5—

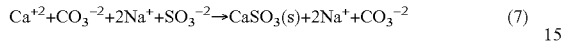

(7)

FIG. 6—Stage 1—

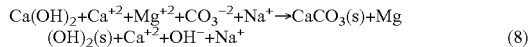

(8)

FIG. 6—Stage 2—

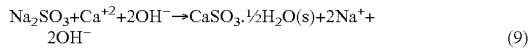

(9)

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:

1. A system designed to treat and/or soften raw water supplied to a non-calcium-based, aqueous wet $SO_x$ scrubber, the system consisting essentially of:
    (a) at least one floc supply means;
    (b) at least one raw water supply means, wherein the raw water contains at least calcium ions and magnesium ions;
    (c) at least one sodium carbonate supply means;
    (d) at least one waste liquor supply means, wherein the waste liquor is supplied from a portion of the waste liquor generated by at least one non-calcium-based, aqueous wet $SO_x$ scrubber and wherein the waste liquor contains solubilized sulfite ions;
    (e) at least one precipitator/crystallizer tank, wherein the at least one floc supply means, the at least one raw water supply means, the at least one sodium carbonate supply means and the at least one waste liquor supply means all supply their respective compounds to the at least one precipitator/crystallizer tank, and wherein the at least one precipitator/crystallizer tank permits and facilitates a reaction between the calcium ions and/or magnesium ions contained in the raw water, the sodium carbonate and the solubilized sulfite ions contained in the waste liquor supply and wherein the at least one precipitator/crystallizer tank has at least one outlet and is designed to remove any undesirable solids from the mixture of compounds supplied from the at least one floc supply means, the at least one raw water supply means, the at least one sodium carbonate supply means and the at least one waste liquor supply means so as to generate a treated solution of floc, sodium carbonate solution, raw water and waste liquor and supply same to the at least one outlet; and
    (f) at least one settler/thickener tank that is in fluid communication with the at least one outlet of the at least one precipitator/crystallizer tank, the at least one settler/thickener tank having at least one outlet designed to supply treated water to a non-calcium-based, aqueous wet $SO_x$ scrubber,
    wherein all of the solubilized sulfite ions necessary for the reaction between the calcium ions and/or magnesium ions contained in the raw water, the sodium carbonate and the solubilized sulfite ions are supplied from the waste liquor generated by the at least one non-calcium-based, aqueous wet $SO_x$ scrubber, and
    wherein all of the calcium ions and/or magnesium ions necessary for the reaction between the calcium ions and/or magnesium ions contained in the raw water, the sodium carbonate and the solubilized sulfite ions are supplied from the raw water.

2. The system of claim 1, further comprising:
    (g) at least one treated water tank that is in fluid communication with the at least one outlet of the at least one settler/thickener tank, the at least one treated water tank designed to receive and hold treated water and having at least one outlet designed to supply treated water to a non-calcium-based, aqueous wet $SO_x$ scrubber.

3. The system of claim 1, wherein less than about 7% by volume of the waste liquor produced by the non-calcium-based, aqueous wet $SO_x$ scrubber is supplied to the at least one waste liquor supply means to treat and/or soften raw water for a non-calcium-based, aqueous wet $SO_x$ scrubber.

4. The system of claim 1, wherein less than about 5% by volume of the waste liquor produced by the non-calcium-based, aqueous wet $SO_x$ scrubber is supplied to the at least one waste liquor supply means to treat and/or soften raw water for a non-calcium-based, aqueous wet $SO_x$ scrubber.

5. The system of claim 1, wherein less than about 3% by volume of the waste liquor produced by the non-calcium-based, aqueous wet $SO_x$ scrubber is supplied the at least one waste liquor supply means to treat and/or soften raw water for a non-calcium-based, aqueous wet $SO_x$ scrubber.

6. The system of claim 1, wherein less than about 2% by volume of the waste liquor produced by the non-calcium-based, aqueous wet $SO_x$ scrubber is supply to the at least one waste liquor supply means to treat and/or soften raw water for a non-calcium-based, aqueous wet $SO_x$ scrubber.

7. The system of claim 1, wherein the reaction that takes place in the at least one precipitator/crystallizer tank of element (e) is represented by the following chemical reaction: $Ca^{+2}+CO_3^{-2}+2Na^++SO_3^{-2}\rightarrow CaSO_3(s)+2Na^++CO_3^{-2}$.

8. A system designed to treat and/or soften raw water supplied to a non-calcium-based, aqueous wet $SO_x$ scrubber, the system comprising:
    (a) at least one floc supply means;
    (b) at least one raw water supply means, wherein the raw water contains at least calcium ions and magnesium ions;
    (c) at least one sodium carbonate supply means;
    (d) at least one waste liquor supply means, wherein the waste liquor is supplied from a portion of the waste liquor generated by at least one non-calcium-based, aqueous wet $SO_x$ scrubber and wherein the waste liquor contains solubilized sulfite ions;
    (e) at least one precipitator/crystallizer tank, wherein the at least one floc supply means, the at least one raw water supply means, the at least one sodium carbonate supply means and the at least one waste liquor supply means all supply their respective compounds to the at least one precipitator/crystallizer tank, and wherein the at least one precipitator/crystallizer tank permits and facilitates a reaction between the calcium ions and/or magnesium ions contained in the raw water, the sodium carbonate and the solubilized sulfite ions contained in the waste liquor supply and wherein the at least one precipitator/crystallizer tank has at least one outlet and is designed to remove any undesirable solids from the mixture of compounds supplied from the at least one floc supply means, the at least one raw water supply means, the at least one sodium carbonate supply means and the at least one waste liquor supply means so as to generate a treated solution of floc, sodium carbonate solution, raw water and waste liquor and supply same to the at least one outlet; and (f) at least one settler/thickener tank that is in fluid communication with the at least one outlet of the at least one precipitator/crystallizer tank, the at least one settler/thickener tank having at least one outlet designed to supply treated water to a non-calcium-based, aqueous wet $SO_x$ scrubber, wherein less than about 7% by volume of the waste liquor produced by the non-calcium-based, aqueous wet $SO_x$ scrubber is supplied to the at least one waste liquor supply means to treat and/or soften raw water for a non-calcium-based, aqueous wet $SO_x$ scrubber.

9. The system of claim 8, further comprising:

(g) at least one treated water tank that is in fluid communication with the at least one outlet of the at least one settler/thickener tank, the at least one treated water tank designed to receive and hold treated water and having at least one outlet designed to supply treated water to a non-calcium-based, aqueous wet $SO_x$ scrubber.

10. The system of claim 8, wherein less than about 5% by volume of the waste liquor produced by the non-calcium-based, aqueous wet $SO_x$ scrubber is supplied to the at least one waste liquor supply means to treat and/or soften raw water for a non-calcium-based, aqueous wet $SO_x$ scrubber.

11. The system of claim 8, wherein less than about 3% by volume of the waste liquor produced by the non-calcium-based, aqueous wet $SO_x$ scrubber is supplied the at least one waste liquor supply means to treat and/or soften raw water for a non-calcium-based, aqueous wet $SO_x$ scrubber.

12. The system of claim 8, wherein less than about 2% by volume of the waste liquor produced by the non-calcium-based, aqueous wet $SO_x$ scrubber is supply to the at least one waste liquor supply means to treat and/or soften raw water for a non-calcium-based, aqueous wet $SO_x$ scrubber.

13. The system of claim 8, wherein the reaction that takes place in the at least one precipitator/crystallizer tank of element (e) is represented by the following chemical reaction: $Ca^{+2}+CO_3^{-2}+2Na^++SO_3^{-2} \rightarrow CaSO_3(s)+2Na^++CO_3^{-2}$.

* * * * *